(12) United States Patent
Bloxham

(10) Patent No.: US 10,107,104 B2
(45) Date of Patent: Oct. 23, 2018

(54) AIRFOILS FOR REDUCING SECONDARY FLOW LOSSES IN GAS TURBINE ENGINES

(71) Applicant: Rolls-Royce Corporation, Indianapolis, IN (US)

(72) Inventor: Matthew J. Bloxham, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 451 days.

(21) Appl. No.: 15/011,081

(22) Filed: Jan. 29, 2016

(65) Prior Publication Data

US 2017/0218774 A1    Aug. 3, 2017

(51) Int. Cl.
*F01D 5/14* (2006.01)
*F01D 9/04* (2006.01)

(52) U.S. Cl.
CPC ............. *F01D 5/145* (2013.01); *F01D 9/041* (2013.01); *F05D 2220/32* (2013.01); *F05D 2240/123* (2013.01); *F05D 2240/124* (2013.01); *F05D 2240/305* (2013.01); *F05D 2240/306* (2013.01)

(58) Field of Classification Search
CPC ...... F01D 5/145; F01D 9/041; F05D 2220/32; F05D 2240/123; F05D 2240/124; F05D 2240/305; F05D 2240/306
See application file for complete search history.

(56) References Cited

U.S. PATENT DOCUMENTS

| | | | |
|---|---|---|---|
| 2,166,823 A | 7/1939 | Rosenlocher | |
| 3,075,743 A | 1/1963 | Sheets | |
| 4,146,352 A * | 3/1979 | Yasugahira | F01D 5/145 |
| | | | 415/144 |
| 5,480,284 A | 1/1996 | Wadia | |
| 6,099,245 A | 8/2000 | Bunker | |
| 6,139,259 A | 10/2000 | Ho | |
| 6,435,815 B2 * | 8/2002 | Harvey | F01D 5/145 |
| | | | 415/115 |
| 8,016,567 B2 * | 9/2011 | Praisner | F01D 5/145 |
| | | | 415/914 |
| 8,092,153 B2 | 1/2012 | Strecker | |
| 8,651,813 B2 | 2/2014 | Long | |
| 2008/0134685 A1 | 6/2008 | Bunker | |
| 2012/0210715 A1 * | 8/2012 | Shibata | F01D 5/141 |
| | | | 60/670 |

OTHER PUBLICATIONS

Langston, Crossflows in a Turbine Cascade Passage, Oct. 1980, p. 886-874, Journal of Engineering for Power.
Sharma & Butler, Predictions of Endwall Losses and Secondary Flows in Axial Flow Turbine Cascades, Jun. 1986, p. 1-10, American Society of Mechanical Engineers.

* cited by examiner

*Primary Examiner* — Richard Edgar
(74) *Attorney, Agent, or Firm* — Barnes & Thornburg LLP

(57) ABSTRACT

Airfoils for gas turbine engines are disclosed herein. The airfoils each include a pressure side and a suction side. Vortex-reduction passageways extend from the pressure side to the suction side.

13 Claims, 3 Drawing Sheets

AIRFOILS FOR REDUCING SECONDARY FLOW LOSSES IN GAS TURBINE ENGINES

FIELD OF THE DISCLOSURE

The present disclosure relates generally to gas turbine engines, and more specifically to airfoils used in gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and the mixture is ignited. Products of the combustion reaction in the combustor are directed into the turbine where work is extracted to drive the compressor and, sometimes, an output shaft. Left-over products of the combustion are exhausted out of the turbine and may provide thrust in some applications.

Products of the combustion reaction directed into the turbine flow over airfoils included in stationary vanes and rotating blades of the turbine. As fluid flows over the airfoils, losses can occur which reduce the performance of the turbine. Minimizing those losses to improve turbine performance therefore remains an area of interest.

SUMMARY

The present disclosure may comprise one or more of the following features and combinations thereof.

According to one aspect of the present disclosure, an airfoil for a gas turbine engine may include a pressure side, a suction side, and a first vortex-reduction passageway. The pressure side may extend radially from a radially-outer point to a radially-inner point arranged opposite the radially-outer point. The suction side may be arranged opposite the pressure side and the suction side may extend radially from the radially-outer point to the radially-inner point. The first vortex-reduction passageway may be arranged to extend directly from the pressure side to the suction side to provide fluid communication from the pressure side to the suction side, and the first vortex-reduction passageway may be located near one of the radially-outer point of the airfoil and the radially-inner point of the airfoil such that the first vortex-reduction passageway is configured to conduct gas from the pressure side to the suction side during use of the airfoil in a gas turbine engine in order to inhibit radial migration of a secondary-flow vortex that may form along a radially-outer portion or a radially-inner portion of the suction side. The first vortex-reduction passageway may be spaced apart from a radially-middle portion of the airfoil located between the radially-outer portion of the airfoil and the radially-inner portion of the airfoil, and the radially-middle portion may be sized to make up at least a third of a distance between the radially-outer point and the radially inner point of the airfoil and devoid of passageways that provide fluid communication directly from the pressure side to the suction side of the airfoil.

In some embodiments, the pressure side and the suction side may interconnect with one another at a leading edge of the airfoil and at a trailing edge of the airfoil positioned aft of the leading edge, and the first vortex-reduction passageway may be located closer to the leading edge than the trailing edge. Additionally, in some embodiments, the airfoil may have an aspect ratio of less than 1.0.

In some embodiments, the first vortex-reduction passageway may extend radially partway through the airfoil from one of the radially-outer point and the radially inner-point toward the other of the radially-outer point and the radially-inner point. The airfoil may further include a second vortex-reduction passageway arranged to extend directly from the pressure side to the suction side to provide fluid communication from the pressure side to the suction side and located between the first vortex-reduction passageway and the radially-middle portion such that the second vortex-reduction passageway is spaced apart from the first vortex-reduction passageway and the radially-middle portion. The airfoil may include further still a third vortex-reduction passageway arranged to extend directly from the pressure side to the suction side to provide fluid communication from the pressure side to the suction side and located between the second vortex-reduction passageway and the radially-middle portion such that the third vortex-reduction passageway is spaced apart from the second vortex-reduction passageway and the radially-middle portion.

In some embodiments, the airfoil may further include an inlet slot formed in the pressure side separately from the first vortex-reduction passageway that is fluidly coupled to the first vortex-reduction passageway to direct gas passing along the pressure side during use of the airfoil in the gas turbine engine into the first vortex-reduction passageway. The inlet slot may extend partway through the airfoil from one of the radially-outer point and the radially-inner point toward the other of the radially-outer point and the radially-inner point. The airfoil may include further still an outlet slot formed in the suction side separately from the first vortex-reduction passageway that is fluidly coupled to the first vortex-reduction passageway to direct gas passing through the first vortex-reduction passageway during use of the airfoil in the gas turbine engine along the suction side. The outlet slot may extend partway through the airfoil from the one of the radially-outer point and the radially-inner point toward the other of the radially-outer point and the radially-inner point.

According to another aspect of the present disclosure, an airfoil for a gas turbine engine may include a pressure side, a suction side, and a first vortex-reduction passageway. The first vortex-reduction passageway may be arranged to extend directly from the pressure side to the suction side to provide fluid communication from the pressure side to the suction side. The first vortex-reduction passageway may be spaced apart from a middle portion of the airfoil that may be located about midway along a height of the airfoil, sized to make up at least a third of the height of the airfoil, and devoid of any passageways that provide fluid communication directly from the pressure side to the suction side of the airfoil.

In some embodiments, the first vortex-reduction passageway may be configured to conduct gas from the pressure side to the suction side during use of the airfoil in a gas turbine engine in order to inhibit radial migration of a secondary-flow vortex that may form along a radially-outer portion or a radially-inner portion of the suction side. The airfoil may have an aspect ratio of less than 1.0. Additionally, in some embodiments, the airfoil may further include (i) a second vortex-reduction passageway arranged to extend directly from the pressure side to the suction side to provide fluid communication from the pressure side to the suction side and located between the first vortex-reduction passageway and the middle portion such that the second vortex-reduction passageway is spaced apart from the first vortex-reduction passageway and the middle portion and (ii) a third vortex-reduction passageway arranged to extend directly from the pressure side to the suction side to provide fluid communication from the pressure side to the suction side and located between the second vortex-reduction passageway and the middle portion such that the third vortex-reduction passageway is spaced apart from the second vortex-reduction passageway and the middle portion.

In some embodiments, the pressure side and the suction side may interconnect with one another at a leading edge of the airfoil and at a trailing edge of the airfoil positioned aft of the leading edge, and the first vortex-reduction passageway may be located closer to the leading edge than the trailing edge. The airfoil may further include (i) an inlet slot separate from the first vortex-reduction passageway that is fluidly coupled to the first vortex-reduction passageway to direct gas passing along the pressure side during use of the airfoil in the gas turbine engine into the first vortex-reduction passageway and (ii) an outlet slot separate from the first vortex-reduction passageway that is fluidly coupled to the first vortex-reduction passageway to direct gas passing through the first vortex-reduction passageway during use of the airfoil in the gas turbine engine along the suction side.

According to yet another aspect of the present disclosure, a vane adapted for use in a gas turbine engine may include an outer end wall, an inner end wall, and an airfoil. The inner end wall may be spaced from the outer end wall. The airfoil may extend from the outer end wall to the inner end wall. The airfoil may have a pressure side, a suction side, and a first vortex-reduction passageway arranged to extend from the pressure side to the suction side to provide fluid communication from the pressure side to the suction side. The first vortex-reduction passageway may extend partway through the airfoil from one of the outer end wall and the inner end wall toward the other of the outer end wall and the inner end wall.

In some embodiments, the first vortex-reduction passageway may be configured to conduct gas from the pressure side to the suction side during use of the vane in a gas turbine engine in order to inhibit radial migration of a secondary-flow vortex that may form along a radially-outer portion or a radially-inner portion of the suction side. Additionally, in some embodiments, the first vortex-reduction passageway may be spaced apart from a middle portion of the vane that is located about midway along a height of the vane, sized to make up at least a third of the height of the vane, and devoid of any passageways that provide fluid communication directly from the pressure side to the suction side of the vane. Finally, in some embodiments still, the airfoil may have an aspect ratio of less than 1.0.

These and other features of the present disclosure will become more apparent from the following description of the illustrative embodiments.

DETAILED DESCRIPTION OF THE DRAWINGS

Figure 1:
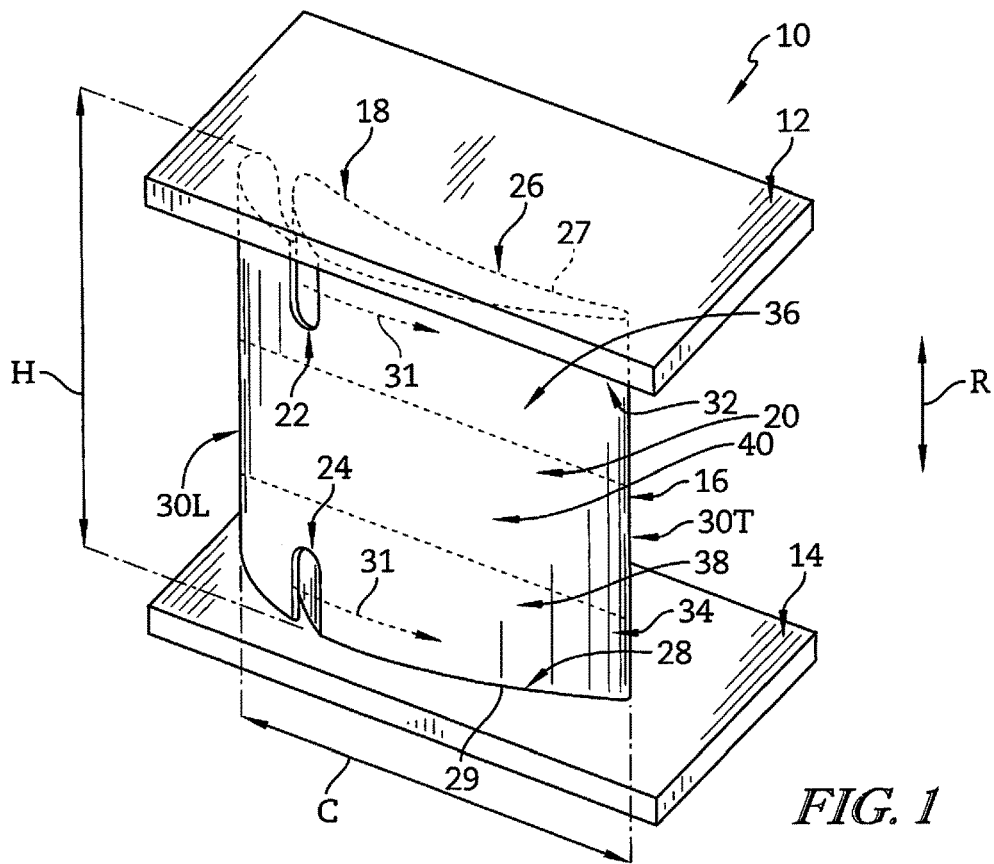
FIG. 1 is a perspective view of a vane adapted for use in a gas turbine engine that includes a pair of end walls and an airfoil that has vortex-reduction passageways arranged in radially inner and outer portions of the airfoil that extend from a pressure side to a suction side to conduct gasses.

Referring now to FIG. 1, an illustrative static vane 10 adapted for use in a turbine section of a gas turbine engine is shown. In other embodiments, the vane 10 may be used in a compressor section or a fan section of a gas turbine engine.

The vane 10 illustratively includes an outer end wall 12, an inner end wall 14, and an airfoil 16 as shown in FIG. 1. The outer end wall 12 is spaced from and positioned outward of the inner end wall 14 in a radial direction indicated by arrow R. As used herein, the term "radial" therefore refers to the radial direction indicated by arrow R. Although the end walls 12, 14 are shown as being substantially rectangular-shaped in FIG. 1, each of the end walls 12, 14 extends circumferentially about a central axis of the gas turbine engine to form part of a ring when assembled with other vanes. The airfoil 16 of the present disclosure includes vortex-reduction passageways 22, 24 that conduct gasses through the airfoil 16 during use in a gas turbine engine to discourage the formation of secondary-flow vortices along surfaces of the airfoil 16. Discouraging secondary-flow vortices along surfaces of the airfoil 16 can improve the efficiency of the airfoil 16 when used in a gas turbine engine.

The airfoil 16 extends from the outer end wall 12 to the inner end wall 14 and has a height or span H and a chord or width C as shown in FIG. 1. Although only one airfoil 16 extends between the end walls 12, 14 as shown in FIG. 1, the airfoil 16 may be one of a plurality of airfoils 16 extending between the annular end walls 12, 14. The plurality of airfoils 16 may be circumferentially spaced about the central axis such that the airfoils 16 and the end walls 12, 14 cooperate to direct fluid or gas passed along the vane 10 toward one or more downstream sections of a gas turbine engine.

In other embodiments, the airfoil 16 may be included in one or more rotatable components of a gas turbine engine. In one example, the airfoil 16 may be included in one or more blades used in a turbine section of a gas turbine engine. In another example, the airfoil 16 may be included in one or more blades used in a compressor section of a gas turbine engine. In yet another example, the airfoil 16 may be included in one or more blades used in a fan section of a gas turbine engine.

Figure 2:
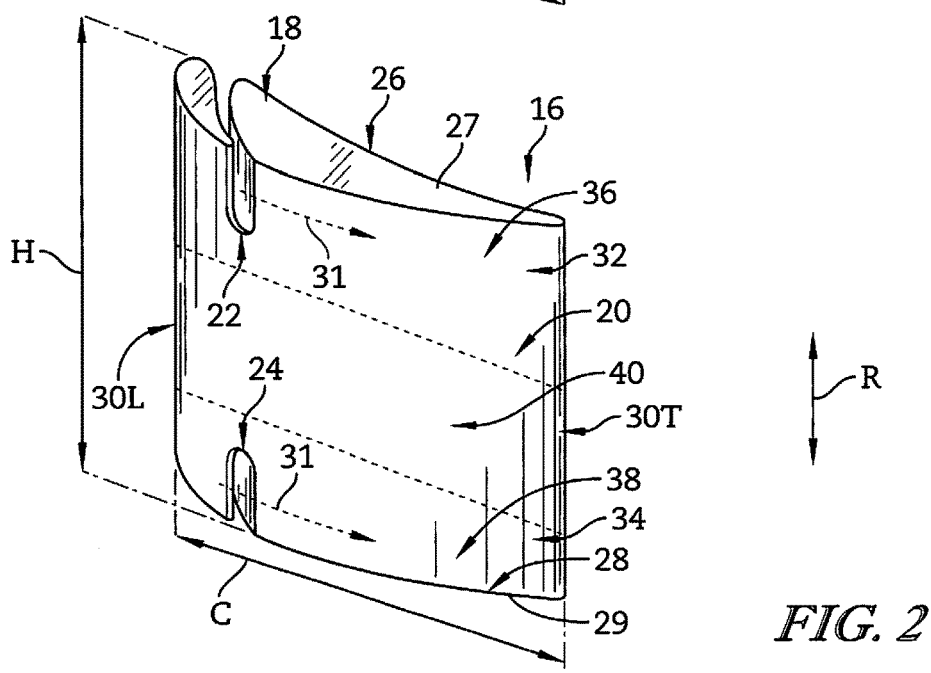
FIG. 2 is another perspective view of the vane of FIG. 1 with the end walls removed for the sake of simplicity suggesting that gasses are passed through the vortex-reduction passageways to interrupt the formation of secondary-flow vortices.

In the illustrative embodiment, the airfoil 16 includes a pressure side 18, a suction side 20, and the vortex-reduction passageways 22, 24 as shown in FIGS. 1 and 2. The pressure side 18 extends radially from an outer point 26 associated with an outer radial surface 27 of the airfoil 16 to an inner point 28 associated with an inner radial surface 29 of the airfoil 16. The suction side 20 is arranged opposite the pressure side 18 and extends radially from the outer point 26 to the inner point 28. The pressure side 18 and the suction side 20 interconnect with one another at a leading edge 30L of the airfoil 16 and at a trailing edge 30T of the airfoil 16 positioned aft of the leading edge 30L along the central axis. The vortex-reduction passageways 22, 24 are arranged to extend directly from the pressure 18 to the suction side 20 to conduct fluid from the pressure side 18 to the suction side 20 during use of the airfoil 16 as indicated by arrows 31.

The vortex-reduction passageways 22, 24 are illustratively configured to conduct fluid from the pressure side 18 to the suction side 20 during use of the airfoil 16 to inhibit radial migration of vortices that may form along the suction side 20 as described below with reference to FIG. 5. The passageway 22 is formed in an outer portion 32 of the airfoil 16 located closer to the outer point 26 than the inner point 28. The passageway 24 is formed in an inner portion 34 of the airfoil 16 located closer to the inner point 28 than the outer point 26 and positioned radially inward of the outer portion 32. The passageway 22 is configured to inhibit radial migration of a vortex that may form along an outer portion 36 of the suction side 20 located closer to the outer point 26 than the inner point 28. The passageway 24 is configured to inhibit radial migration of a vortex that may form along an inner portion 38 of the suction side 20 located closer to the inner point 28 than the outer point 26 and positioned radially inward of the outer portion 36.

The vortex-reduction passageways 22, 24 are illustratively spaced apart from a middle portion 40 of the airfoil 16 that is located radially between the outer and inner portions 32, 34 as shown in FIGS. 1 and 2. The middle portion 40 is sized to make up at least a third of the radial distance between the outer and inner points 26, 28. In other words, the middle portion 40 is sized to make up at least a third of the height H of the airfoil 16. Unlike the outer and inner portions 32, 34, the middle portion 40 is devoid of passageways that provide fluid communication directly from the pressure side 18 to the suction side 20.

In the illustrative embodiment, the outer and inner portions 32, 34 of the airfoil 16 are cooperatively sized to make up no more than two thirds of the radial distance between the outer and inner points 26, 28 as suggested by FIG. 2. That is, the outer and inner portions 32, 34 are cooperatively sized to make up no more than two thirds of the height H of the airfoil 16. The outer and inner portions 32, 34 are sized substantially equal to one another but may be sized differently from one another in other embodiments.

In the illustrative embodiment, each of the vortex-reduction passageways 22, 24 is located closer to the leading edge 30L of the airfoil 16 than the trailing edge 30T of the airfoil 16 as shown in FIG. 2. Additionally, in the illustrative embodiment, the aspect ratio (i.e., the ratio of the height H to the chord C) of the airfoil 16 is less than 1.0.

In the illustrative embodiment, the vortex-reduction passageway 22 extends radially partway through the airfoil 16 from the outer point 26 toward the inner point 28 as shown in FIG. 2. The vortex-reduction passageway 24 extends radially partway through the airfoil 16 from the inner point 28 toward the outer point 26 as shown in FIG. 2. As such, the passageways 22, 24 are arranged opposite one another.

In some embodiments, the airfoil 16 may be constructed of ceramic matrix composite materials. For example, the airfoil 16 may be constructed of ceramic-containing matrix materials having ceramic-containing reinforcing fibers suspended therein. In other embodiments, however, the airfoil 16 may have another suitable construction.

Figure 3:
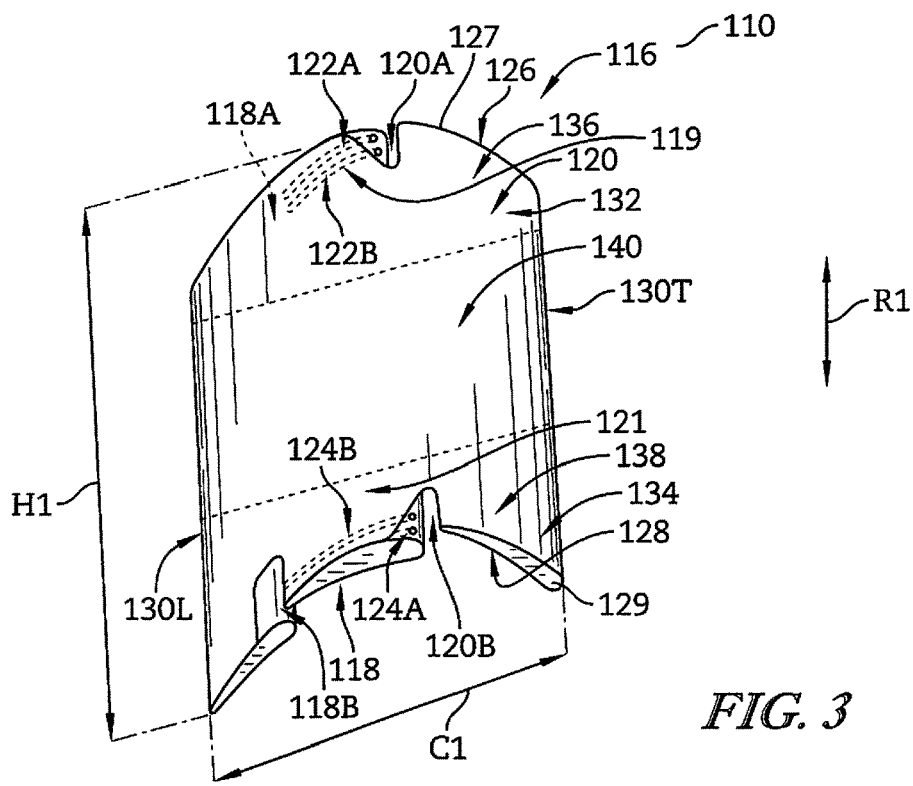
FIG. 3 is a perspective view of an airfoil of another vane adapted for use in a gas turbine engine that includes vortex-reduction passageways arranged to extend from a pressure side to a suction side of the airfoil, inlet slots fluidly coupled to the vortex-reduction passageways to direct gas passing along the pressure side into the vortex-reduction passageways, and outlet slots fluidly coupled to the vortex-reduction passageways to direct gas passing through the vortex-reduction passageways along the suction side.

Referring now to FIG. 3, another illustrative static vane 110 adapted for use in a turbine section of a gas turbine engine is shown. In other embodiments, the vane 110 may be used in a compressor section or a fan section of a gas turbine engine.

The vane 110 illustratively includes an airfoil 116 as shown in FIG. 3. Although not shown in FIG. 3, the vane 110 includes an outer end wall and an inner end wall similar to the respective outer and inner end walls 12, 14, and the airfoil 116 extends radially between the outer and inner end walls. The airfoil 116 of the present disclosure includes vortex-reduction passageways 122A, 122B, 124A, 124B that conduct gasses through the airfoil 116 during use in a gas turbine engine to discourage the formation of secondary-flow vortices along surfaces of the airfoil 116. Discouraging secondary-flow vortices along surfaces of the airfoil 116 can improve the efficiency of the airfoil 116 when used in a gas turbine engine.

The airfoil 116 has a height or span H1 and a chord or width C1 as shown in FIG. 3. Although only one airfoil 116 is shown in FIG. 3, the airfoil 116 may be one of a plurality of airfoils 116 extending between the outer and inner end walls. The plurality of airfoils 116 may be circumferentially spaced about a central axis of the gas turbine engine such that the airfoils 116 and the end walls cooperate to direct fluid or gas passed along the vane 110 toward one or more downstream sections of a gas turbine engine.

In other embodiments, the airfoil 116 may be included in one or more rotatable components of a gas turbine engine. In one example, the airfoil 116 may be included in one or more blades used in a turbine section of a gas turbine engine. In another example, the airfoil 116 may be included in one or more blades used in a compressor section of a gas turbine engine. In yet another example, the airfoil 116 may be included in one or more blades used in a fan section of a gas turbine engine.

In the illustrative embodiment, the airfoil 116 illustratively includes a pressure side 118, a suction side 120, inlet slots 118A, 118B, and outlet slots 120A, 120B as shown in FIG. 3. The pressure side 118 extends radially (i.e., in the direction indicated by arrow R1) from an outer point 126 associated with an outer radial surface 127 of the airfoil 116 to an inner point 128 associated with an inner radial surface 129 of the airfoil 116. The suction side 120 is arranged opposite the pressure side 118 and extends radially from the outer point 126 to the inner point 128. The pressure side 118 and the suction side 120 interconnect with one another at a leading edge 130L of the airfoil 116 and at a trailing edge 130T of the airfoil 116 positioned aft of the leading edge 130L along the central axis. The inlet slots 118A, 118B are spaced apart from each other and extend through the pressure side 118 and the outlet slots 120A, 120B are spaced apart from each other and extend through the suction side 120. The inlet slot 118A is fluidly coupled to the outlet slot 120A and the inlet slot 118B is fluidly coupled to the outlet slot 120B.

The airfoil 116 illustratively includes the vortex-reduction passageways 122A, 122B, 124A, 124B as shown in FIG. 3. The passageways 122A, 122B extend directly from the inlet slot 118A to the outlet slot 120A to conduct fluid from the pressure side 118 to the suction side 120 during use of the airfoil 116 in the gas turbine engine. The passageways 124A, 124B extend directly from the inlet slot 118B to the outlet slot 120B to conduct fluid from the pressure side 118 to the suction side 120 during use of the airfoil 116 in the gas turbine engine. As such, the passageways 122A, 122B fluidly couple the inlet slot 118A to the outlet slot 120A and the passageways 124A, 124B fluidly couple the inlet slot 118B to the outlet slot 120B.

The inlet slots 118A, 118B are formed in the pressure side 118 separately from the vortex-reduction passageways 122A, 122B, 124A, 124B as shown in FIG. 3. Similarly, the outlet slots 120A, 120B are formed in the suction side 120 separately from the passageways 122A, 122B, 124A, 124B. The inlet slot 118A is fluidly coupled to the passageways 122A, 122B and the inlet slot 118B is fluidly coupled to the passageways 124A, 124B to direct fluid passing along the pressure side 118 during use of the airfoil 116 into the respective passageways 122A, 122B, 124A, 124B. The outlet slot 120A is fluidly coupled to the passageways 122A, 122B and the outlet slot 120B is fluidly coupled to the passageways 124A, 124B to direct fluid passing through the respective passageways 122A, 122B, 124A, 124B during use of the airfoil 116 along the suction side 120.

In the illustrative embodiment, the inlet and outlet slots 118A, 120A extend radially partway through the airfoil 116 from the outer point 126 toward the inner point 128 as shown in FIG. 3. The inlet and outlet slots 118B, 120B extend radially partway through the airfoil 116 from the inner point 128 toward the outer point 126. As such, the inlet and outlet slots 118A, 120A are arranged opposite the inlet and outlet slots 118B, 120B.

The vortex-reduction passageways 122A, 122B are illustratively radially spaced from each other and formed in a central portion 119 of the airfoil 116 extending between the slots 118A, 120A as shown in FIG. 3. The vortex-reduction passageways 124A, 124B are radially spaced from each other and formed in a central portion 121 of the airfoil 116 arranged opposite the central portion 119 and extending between the slots 118B, 120B. The central portions 119, 121 are located generally midway between the leading edge 130L and the trailing edge 130T of the airfoil 116.

The vortex-reduction passageways 122A, 122B, 124A, 124B are illustratively configured to conduct fluid from the pressure side 118 to the suction side 120 during use of the airfoil 116 to inhibit radial migration of vortices that may form along the suction side 120 as described below with reference to FIG. 5. The passageways 122A, 122B are formed in an outer portion 132 of the airfoil 116 located closer to the outer point 126 than the inner point 128. The passageways 124A, 124B are formed in an inner portion 134 of the airfoil 116 located closer to the inner point 128 than the outer point 126 and positioned radially inward of the outer portion 132. The passageways 122A, 122B are configured to inhibit radial migration of a vortex that may form along an outer portion 136 of the suction side 120 located closer to the outer point 126 than the inner point 128. The passageways 124A, 124B are configured to inhibit radial migration of a vortex that may form along an inner portion 138 of the suction side 120 located closer to the inner point 128 than the outer point 126 and positioned radially inward of the outer portion 136.

The vortex-reduction passageways 122A, 122B, 124A, 124B are illustratively spaced apart from a middle portion 140 of the airfoil 116 that is located radially between the outer and inner portions 132, 134 as shown in FIG. 3. The middle portion 140 is sized to make up at least a third of the radial distance between the outer and inner points 126, 128. In other words, the middle portion 140 is sized to make up at least a third of the height H1 of the airfoil 116. Unlike the outer and inner portions 132, 134, the middle portion 140 is devoid of passageways that provide fluid communication directly from the pressure side 118 to the suction side 120.

In the illustrative embodiment, the outer and inner portions 132, 134 of the airfoil 116 are cooperatively sized to make up no more than two thirds of the radial distance between the outer and inner points 126, 128 as suggested by FIG. 3. That is, the outer and inner portions 132, 134 are cooperatively sized to make up no more than two thirds of the height H1 of the airfoil 116. The outer and inner portions 132, 134 are sized substantially equal to one another but may be sized differently from one another in other embodiments.

In the illustrative embodiment, the aspect ratio (i.e., the ratio of the height H1 to the chord C1) of the airfoil 116 is less than 1.0. In some embodiments, the airfoil 116 may be constructed of ceramic matrix composite materials. For example, the airfoil 116 may be constructed of ceramic-containing matrix materials having ceramic-containing reinforcing fibers suspended therein. In other embodiments, however, the airfoil 116 may have another suitable construction.

Figure 4:
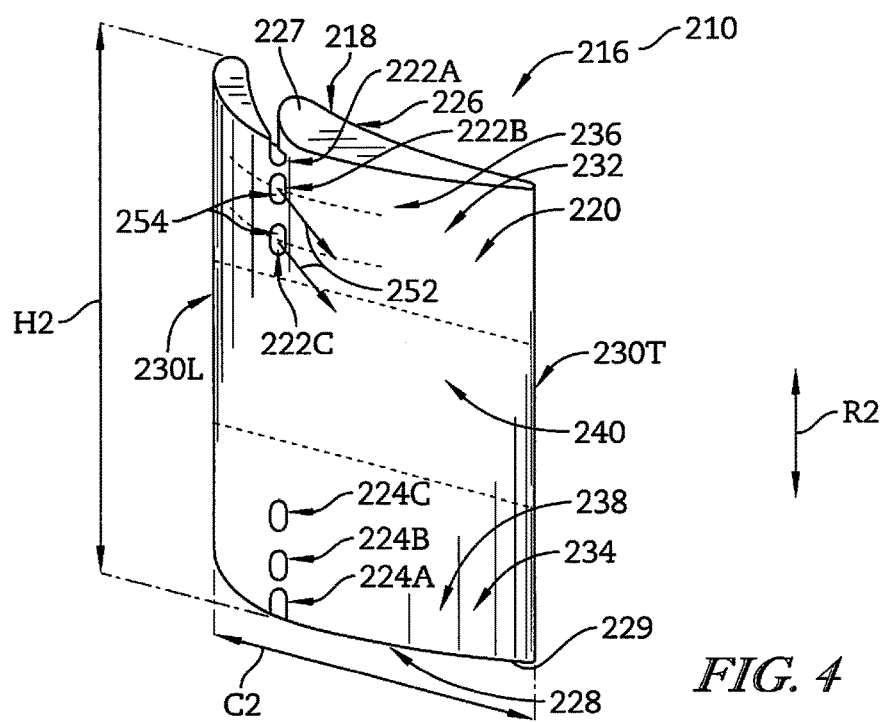
FIG. 4 is a perspective view of an airfoil of yet another vane adapted for use in a gas turbine engine that includes an airfoil that has vortex-reduction passageways arranged to extend from a pressure side to a suction side of the airfoil through inner and outer radial surfaces of the airfoil and vortex-reduction passageways arranged to extend from the pressure side to the suction side that are radially spaced apart from the inner and outer radial surfaces of the airfoil.

Referring now to FIG. 4, yet another illustrative static vane 210 adapted for use in a turbine section of a gas turbine engine is shown. In other embodiments, the vane 10 may be used in a compressor section or a fan section of a gas turbine engine.

The vane 210 illustratively includes an airfoil 216 as shown in FIG. 4. Although not shown in FIG. 4, the vane 210 includes an outer end wall and an inner end wall similar to the respective outer and inner end walls 12, 14, and the airfoil 216 extends radially between the outer and inner end walls. The airfoil 216 of the present disclosure includes vortex-reduction passageways 222A, 222B, 222C, 224A, 224B, 224C that conduct gasses through the airfoil 216 during use in a gas turbine engine to discourage the formation of secondary-flow vortices along surfaces of the airfoil 216. Discouraging secondary-flow vortices along surfaces of the airfoil 216 can improve the efficiency of the airfoil 216 when used in a gas turbine engine.

The airfoil 216 has a height or span H2 and a chord or width C2 as shown in FIG. 4. Although only one airfoil 216 is shown in FIG. 4, the airfoil 216 may be one of a plurality of airfoils 216 extending between the outer and inner end walls. The plurality of airfoils 216 may be circumferentially spaced about a central axis of the gas turbine engine such that the airfoils 216 and the end walls cooperate to direct fluid or gas passed along the vane 210 toward one or more downstream sections of a gas turbine engine.

In other embodiments, the airfoil 216 may be included in one or more rotatable components of a gas turbine engine. In one example, the airfoil 216 may be included in one or more blades used in a turbine section of a gas turbine engine. In another example, the airfoil 216 may be included in one or more blades used in a compressor section of a gas turbine engine. In yet another example, the airfoil 216 may be included in one or more blades used in a fan section of a gas turbine engine.

In the illustrative embodiment, the airfoil 216 illustratively includes a pressure side 218, a suction side 220, and the vortex-reduction passageways 222A, 222B, 222C, 224A, 224B, 224C as shown in FIG. 4. The pressure side 218 extends radially (i.e., in the direction indicated by arrow R2) from an outer point 226 associated with an outer radial surface 227 to an inner point 228 associated with an inner radial surface 229. The suction side 220 is arranged opposite the pressure side 218 and extends radially from the outer point 226 to the inner point 228. The pressure side 218 and the suction side 220 interconnect with one another at a leading edge 230L of the airfoil 216 and at a trailing edge 230T of the airfoil 216 positioned aft of the leading edge 230L along the central axis. The vortex-reduction passageways 222A, 222B, 222C, 224A, 224B, 224C are arranged to extend directly from the pressure 218 to the suction side 220 to conduct fluid from the pressure side 218 to the suction side 220 during use of the airfoil 216.

The vortex-reduction passageways 222A, 222B, 222C, 224A, 224B, 224C are illustratively configured to conduct fluid from the pressure side 218 to the suction side 220 during use of the airfoil 216 to inhibit radial migration of vortices that may form along the suction side 220 as described below with reference to FIG. 5. The passageways 222A, 222B, 222C are formed in an outer portion 232 of the airfoil 216 located closer to the outer point 226 than the inner point 228. The passageways 224A, 224B, 224C are formed in an inner portion 234 of the airfoil 216 located closer to the inner point 228 than the outer point 226 and positioned radially inward of the outer portion 232. The passageways 222A, 222B, 222C are configured to inhibit radial migration of a vortex that may form along an outer portion 236 of the suction side 220 located closer to the outer point 226 than the inner point 228. The passageways 224A, 224B, 224C are configured to inhibit radial migration of a vortex that may form along an inner portion 238 of the suction side 220 located closer to the inner point 228 than the outer point 226 and positioned radially inward of the outer portion 236.

The vortex-reduction passageways 222A, 222B, 222C, 224A, 224B, 224C are illustratively spaced apart from a middle portion 240 of the airfoil 216 that is located radially between the outer and inner portions 232, 234 as shown in FIG. 4. The middle portion 240 is sized to make up at least a third of the radial distance between the outer and inner points 226, 228. In other words, the middle portion 240 is sized to make up at least a third of the height H2 of the airfoil 216. Unlike the outer and inner portions 232, 234, the middle portion 240 is devoid of passageways that provide fluid communication directly from the pressure side 218 to the suction side 220.

In the illustrative embodiment, the outer and inner portions 232, 234 of the airfoil 216 are cooperatively sized to make up no more than two thirds of the radial distance between the outer and inner points 226, 228 as suggested by FIG. 4. That is, the outer and inner portions 232, 234 are cooperatively sized to make up no more than two thirds of the height H2 of the airfoil 216. The outer and inner portions 232, 234 are sized substantially equal to one another but may be sized differently from one another in other embodiments.

In the illustrative embodiment, each of the vortex-reduction passageways 222A, 222B, 222C, 224A, 224B, 224C is located closer to the leading edge 230L of the airfoil 216 than the trailing edge 230T of the airfoil 216 as shown in FIG. 4. Additionally, in the illustrative embodiment, the aspect ratio (i.e., the ratio of the height H2 to the chord C2) of the airfoil 216 is less than 1.0.

In the illustrative embodiment, the vortex-reduction passageway 222A extends radially partway through the airfoil 216 from the outer point 226 toward the inner point 228 as shown in FIG. 4. The vortex-reduction passageway 222B is located between the passageway 222A and the middle portion 240 such that the passageway 222B is spaced apart from the passageway 222A and the middle portion 240. The vortex-reduction passageway 222C is located between the passageway 222B and the middle portion 240 such that the passageway 222C is spaced apart from the passageway 222B and the middle portion 240. As such, the passageway 222B is located radially inward of the passageway 222A and the passageway 222C is located radially inward of the passageway 222B.

In the illustrative embodiment, the vortex-reduction passageway 224A extends radially partway through the airfoil 216 from the inner point 228 toward the outer point 226 as shown in FIG. 4. The vortex-reduction passageway 224B is located between the passageway 224A and the middle portion 240 such that the passageway 224B is spaced apart from the passageway 224A and the middle portion 240. The vortex-reduction passageway 224C is located between the passageway 224B and the middle portion 240 such that the passageway 224C is spaced apart from the passageway 224B and the middle portion 240. As such, the passageway 224B is located radially inward of the passageway 224A and the passageway 224C is located radially inward of the passageway 224B.

In some embodiments, the airfoil 216 may be constructed of ceramic matrix composite materials. For example, the airfoil 216 may be constructed of ceramic-containing matrix materials having ceramic-containing reinforcing fibers suspended therein. In other embodiments, however, the airfoil 216 may have another suitable construction.

In some embodiments, one or more of the vortex-reduction passageways 222A, 222B, 222C, 224A, 224B, 224C may be formed to deflect fluid flow radially outward toward the outer point 226 or radially inward toward the inner point 228 as indicated by arrows 252 shown in FIG. 4. For example, one or more of the passageways 222A, 222B, 222C, 224A, 224B, 224C may be formed to include a flow deflector 254 configured to deflect fluid flow radially outward or radially outward in use of the airfoil 216 in the gas turbine engine.

Figure 5:
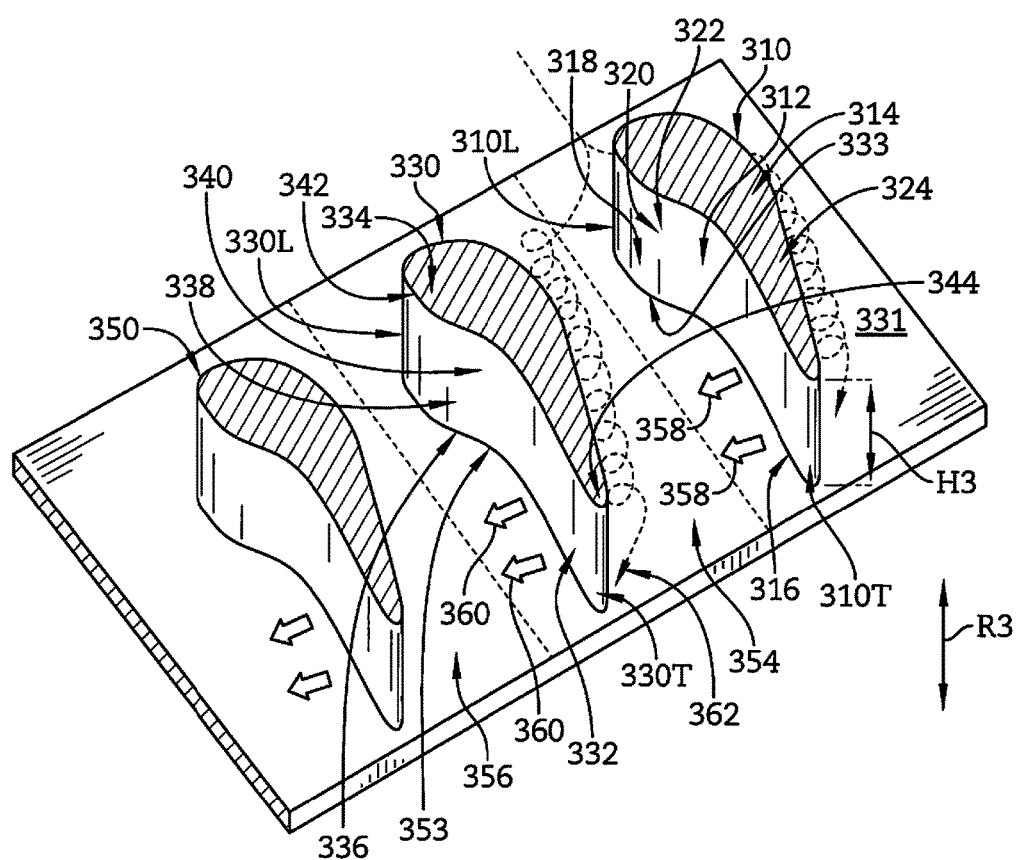
FIG. 5 is a perspective view of a series of vanes adapted for use in a gas turbine engine that include airfoils that do not have vortex-reduction passageways showing secondary-flow vortices forming and climbing along suction sides of the airfoils.

Referring now to FIG. 5, secondary-flow vortices that may form along the suction sides of airfoils during use of the airfoils in gas turbine engines will be described in detail. The airfoils 16, 116, 216 disclosed herein are configured to reduce pressure gradients leading to the formation of such vortices when the airfoils 16, 116, 216 are used in gas turbine engines. Additionally, the airfoils 16, 116, 216 are configured to inhibit radial migration of such vortices during use of the airfoils 16, 116, 216 in gas turbine engines.

Airfoils 310, 330, 350 are substantially identical to one another and arranged circumferentially adjacent one another about a central axis of a gas turbine engine as shown in FIG. 5. During use of the airfoils 310, 330, 350 in a gas turbine engine, fluid moves along the airfoils 310, 330, 350 in substantially the same manner. Additionally, during use of the airfoils 310, 330, 350 in a gas turbine engine, fluid flows between the airfoils 310, 330 in substantially the same manner as fluid flows between the airfoils 330, 350. As such, only the components of the airfoils 310, 330, fluid flow along the airfoils 310, 330 during use of the airfoils 310, 330, and fluid flow between the airfoils 310, 330 during use of the airfoils 310, 330 will be described in detail below.

The airfoil 310 includes a pressure side 312 that extends in a radial direction indicated by arrow R3 from an outer point 314 to an inner point 316 arranged opposite the outer point 314 as shown in FIG. 5. The pressure side 312 has an inner portion 318, a middle portion 320 positioned radially outward of the inner portion 318, and an outer portion 322 positioned radially outward of the middle portion 320. The airfoil 310 also includes a suction side 324 that is arranged opposite the pressure side 312 and extends radially from the outer point 314 to the inner point 316.

The pressure and suction sides 312, 324 of the airfoil 310 interconnect at a leading edge 310L and at a trailing edge 310T of the airfoil 310 positioned aft of the leading edge 310L along the central axis as shown in FIG. 5. The inner point 316 of the airfoil 310 interfaces with an end wall 331 at a junction 333 that extends from the leading edge 310L to the trailing edge 310T.

The airfoil 330 includes a pressure side 332 that extends radially from an outer point 334 to an inner point 336 arranged opposite the outer point 334 as shown in FIG. 5. The pressure side 332 has an inner portion 338, a middle portion 340 positioned radially outward of the inner portion 338, and an outer portion 342 positioned radially outward of the middle portion 340. The airfoil 330 also includes a suction side 344 that is arranged opposite the pressure side 332 and extends radially from the outer point 334 to the inner point 336.

The pressure and suction sides 332, 344 of the airfoil 330 interconnect at a leading edge 330L and at a trailing edge 330T of the airfoil 330 positioned aft of the leading edge 330L along the central axis as shown in FIG. 5. The inner point 336 of the airfoil 330 interfaces with the end wall 331 at a junction 353 that extends from the leading edge 330L to the trailing edge 330T.

As fluid moves along the airfoils 310, 330 as shown in FIG. 5, pressure gradients are established between the pressure and suction sides 312, 324 of the airfoil 310 and between the pressure and suction sides 332, 344 of the airfoil 330. The pressure gradients are characterized by higher pressure on the pressure side 312 than on the suction side 324 of the airfoil 310 and by higher pressure on the pressure side 332 than on the suction side 344 of the airfoil 330. The pressure gradients are established over an entire height H3 of each of the airfoils 310, 330.

The pressure gradients affect fluid flow along portions of the airfoils 310, 330 in different ways. One pressure gradient may have a tendency to cause fluid flowing along the pressure side 312 of the airfoil 310 to flow across a passage 354 (described below as "cross-passage flow") defined between the airfoils 310, 330 toward the airfoil 330. Another pressure gradient may have a tendency to cause fluid flowing along the pressure side 332 of the airfoil 330 to flow across a passage 356 (also described below as "cross-passage flow") defined between the airfoils 330, 350 toward the airfoil 350. The momentum of fluid flowing along the middle portion 320 of the pressure side 312 of the airfoil 310 and along the middle portion 340 of the pressure side 332 of the airfoil 330 is generally sufficient to resist cross-passage flow. However, the momentum of fluid flowing along the pressure side 312 of the airfoil 310 at the junction 333, for example, is generally insufficient to resist cross-passage flow. As a result, cross-passage flow away from the junction 333 occurs as indicated by arrows 358 shown in FIG. 5 such that fluid flows away from the junction 333 toward the suction side 344 of the airfoil 330. Cross-passage flow away from the junction 353 as indicated by arrows 360 toward the airfoil 350 also occurs for substantially the same reasons that cross-passage flow occurs away from the junction 333.

Cross-passage flow indicated by arrows 358 interacts with fluid flow along the suction side 344 of the airfoil 330 such that a vortex 362 is formed near the junction 353 along the suction side 344 of the airfoil 330 as shown in FIG. 5. Because formation of the vortex 362 is due to cross-passage or secondary flow, the vortex 362 may be referred to herein as a secondary-flow vortex. The pressure gradient established between the pressure and suction sides 332, 344 of the airfoil 330 causes the vortex 362 to reside near the junction 353 along the suction side 344. The secondary-flow vortex 362 causes a three-dimensional boundary layer separation near the junction 353 to occur which may reduce the performance of the airfoil 330.

Rotation of the secondary-flow vortex 362 has the tendency to cause the vortex 362 to radially migrate along the suction side 344 of the airfoil 330 away from the junction 353 toward the outer portion 342 as suggested by FIG. 5. As the vortex 362 radially migrates toward the outer portion 342, the three-dimensional boundary layer separation increases, thereby potentially further reducing the performance of the airfoil 330.

Performance reduction due to radial migration of secondary-flow vortices is particularly applicable to airfoils having low aspect ratios, i.e., aspect ratios less than 1.0 like the airfoils 16, 116, 216 disclosed herein. Secondary-flow vortices which form on airfoils having aspect ratios less than 1.0 reside on the airfoils for greater amounts of time and migrate over smaller radial distances than secondary-flow vortices which form on airfoils having aspect ratios greater than 1.0.

The illustrative airfoils 16, 116, 216 of the present disclosure are configured to reduce the pressure gradients leading to the formation of secondary-flow vortices such as the vortex 362 when the airfoils 16, 116, 216 are used in gas turbine engines. Using the airfoil 16 as an example, the vortex-reduction passageways 22, 24 conduct fluid from the pressure side 18 to the suction side 20. As a result, the pressure difference between the sides 18, 20 is decreased, thereby reducing the pressure gradient associated with that pressure difference. Reduction of the pressure gradient leads to a reduction in the driving force of secondary-flow vortices which may reside along the outer and inner portions 36, 38 of the suction side 20. Because the driving force of such secondary-flow vortices tends to reduce performance of the airfoil 16, the passageways 22, 24 improve performance of the airfoil 16 by reducing those driving forces compared to an airfoil that does not include the passageways 22, 24.

The illustrative airfoils 16, 116, 216 of the present disclosure are also configured to inhibit the radial migration of secondary-flow vortices that may form along the suction sides 18, 118, 218 of the airfoils 16, 116, 216. Using the airfoil 16 as an example, the vortex-reduction passageways 22, 24 conduct fluid from the pressure side 18 to the suction side 20 as indicated above. Fluid conducted from the pressure side 18 to the suction side 20 inhibits radial migration of secondary-flow vortexes along the height H of the airfoil 16 which may reside along the outer and inner portions 36, 38 of the suction side 18. As a result, three-dimensional boundary layer separation and the performance reductions associated therewith are reduced by the passageways 22, 24. For that additional reason, the passageways 22, 24 improve performance of the airfoil 16 compared to an airfoil that does not include the passageways 22, 24.

Secondary flow losses (e.g., losses due to cross-passage flow as described above) may represent a significant portion of the aerodynamic losses in a turbine. The aerodynamic losses due to secondary flow losses may increase as airfoil aspect ratio decreases.

Features of the present disclosure (e.g., the airfoils 16, 116, 216) may address the mechanisms that drive the formation of secondary flows as well as suppress the secondary flows once they have developed. Features of the present disclosure may result in reduction in losses due to secondary flows and allow more uniform flow through each turbine stage to be achieved, which may thereby provide a performance improvement.

30-50% of aerodynamic losses associated with conventional airfoil designs (e.g., airfoils 310, 330, 350) used in turbines may be due to secondary flows near the end-wall region (e.g., the junctions 333, 353). Industry emphasis on small core engines may increase the contribution of secondary flow losses to overall losses in gas turbine engines. As such, mitigation of secondary flow losses may be an important concern for maximizing turbine efficiency in small core engines.

Secondary flows may form due to the influence of passage pressure gradients (e.g., the pressure gradients described above) on the lower momentum end-wall boundary layer fluid (e.g., fluid flow along the junction 333). As low momentum fluid moves into a passage between airfoils (e.g., the passage 354) it may roll into multiple vortexes (e.g., the vortex 362), which may be driven by the pressure gradients to the suction surfaces (e.g., the suction side 344 of the airfoil 330) of the turbine vane/blade. As a result, airfoil lift may be reduced and non-uniformities in the vane/blade wakes may occur.

Features of the present disclosure may simultaneously alleviate the pressure gradients that drive the secondary flows across the passage and provide flow to re-energize the boundary layer on the airfoil surface. The present disclosure may be considered a hybrid tandem and conventional airfoil design. The small passages (e.g., the vortex-reduction passageways 22, 24) at the hub (e.g., the inner portion 34) and tip (e.g., the outer portion 32) may allow flow to move through the airfoil. Were the passages not included, the flow that moves through the passages may be caught up in the passage vortex and pushed across the passage to the adjacent airfoil suction surface (e.g., the suction side 344 of the airfoil 330). Because of the small passages, the cross passage pressure gradient may be reduced. The flow that moves through the small passages may be used to re-energize the boundary layer of the suction surface.

Features of the present disclosure may allow a number of benefits to be achieved. In one respect, the present design may allow reductions in aerodynamic losses to be achieved as a result of the reduction of the size and influence of secondary flow losses. In another respect, the present design may allow more uniform airfoil wakes (in terms of wake width and exit air angle) to be achieved which may benefit downstream gas turbine engine stages. In yet another respect, the present design may provide a secondary flow mitigation approach that does not depend on outside energy sources. In yet another respect still, the present design may provide the potential for more aggressive loading, which may reduce the total number of airfoils included in a given turbine stage. Finally, the present design may potentially reduce over-tip leakage, as the flow through the passage may be used to re-energize the suction surface boundary layer and/or minimize the radial migration of the tip vortex. The over-tip leakage benefit may allow the present design to be used as a tip treatment for a shroudless turbine blade. In that application, the slots may be employed in an effort to entrain the over-tip leakage and turn the flow in a stream-wise direction.

According to the present disclosure, airfoils may include multiple axial passages (e.g., the vortex-reduction passageways 122A, 122B, 124A, 124B). In another aspect, airfoils may include multiple radial passages (e.g., the vortex-reduction passageways 222A, 222B, 222C, 224A, 224B, 224C). In yet another aspect, airfoils may include features (e.g., the flow deflector 254) that turn the flow radially upward or downward as it passes through the small passages.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. An airfoil for a gas turbine engine, the airfoil comprising
   a pressure side that extends radially from a radially-outer point to a radially-inner point arranged opposite the radially-outer point,
   a suction side arranged opposite the pressure side that extends radially from the radially-outer point to the radially-inner point,
   a first vortex-reduction passageway arranged to extend directly from the pressure side to the suction side to provide fluid communication from the pressure side to the suction side and located near one of the radially-outer point of the airfoil and the radially-inner point of the airfoil such that the first vortex-reduction passageway is configured to conduct gas from the pressure side to the suction side during use of the airfoil in a gas turbine engine in order to inhibit radial migration of a secondary-flow vortex that may form along a radially-outer portion or a radially-inner portion of the suction side,
   an inlet slot formed in the pressure side separately from the first vortex-reduction passageway that is fluidly coupled to the first vortex-reduction passageway to direct gas passing along the pressure side during use of the airfoil in the gas turbine engine into the first vortex-reduction passageway, and
   an outlet slot formed in the suction side separately from the first vortex-reduction passageway that is fluidly coupled to the first vortex-reduction passageway to direct gas passing through the first vortex-reduction passageway during use of the airfoil in the gas turbine engine along the suction side,
   wherein the first vortex-reduction passageway is spaced apart from a radially-middle portion of the airfoil located between the radially-outer portion of the airfoil and the radially-inner portion of the airfoil, the radially-middle portion sized to make up at least a third of a distance between the radially-outer point and the radially inner point of the airfoil, and the radially-middle portion is devoid of passageways that provide fluid communication directly from the pressure side to the suction side of the airfoil, and wherein the inlet slot extends partway through the airfoil from one of the radially-outer point and the radially-inner point toward the other of the radially-outer point and the radially-inner point.

2. The airfoil of claim 1, wherein the pressure side and the suction side interconnect with one another at a leading edge of the airfoil and at a trailing edge of the airfoil positioned aft of the leading edge and the first vortex-reduction passageway is located closer to the leading edge than the trailing edge.

3. The airfoil of claim 1, wherein the airfoil has an aspect ratio of less than 1.0.

4. The airfoil of claim 1, wherein the first vortex-reduction passageway extends radially partway through the airfoil from one of the radially-outer point and the radially-inner point toward the other of the radially-outer point and the radially-inner point.

5. The airfoil of claim 4, further comprising a second vortex-reduction passageway arranged to extend directly from the pressure side to the suction side to provide fluid communication from the pressure side to the suction side and located between the first vortex-reduction passageway and the radially-middle portion such that the second vortex-reduction passageway is spaced apart from the first vortex-reduction passageway and the radially-middle portion.

6. The airfoil of claim 1, wherein the outlet slot extends partway through the airfoil from the one of the radially-outer point and the radially-inner point toward the other of the radially-outer point and the radially-inner point.

7. An airfoil for a gas turbine engine, the airfoil comprising
a pressure side,
a suction side,
a first vortex-reduction passageway arranged to extend directly from the pressure side to the suction side to provide fluid communication from the pressure side to the suction side, wherein the first vortex-reduction passageway is spaced apart from a middle portion of the airfoil that is located about midway along a height of the airfoil, sized to make up at least a third of the height of the airfoil, and devoid of any passageways that provide fluid communication directly from the pressure side to the suction side of the airfoil,
an inlet slot separate from the first vortex-reduction passageway that is fluidly coupled to the first vortex-reduction passageway to direct gas passing along the pressure side during use of the airfoil in the gas turbine engine into the first vortex-reduction passageway, and
an outlet slot separate from the first vortex-reduction passageway that is fluidly coupled to the first vortex-reduction passageway to direct gas passing through the first vortex-reduction passageway during use of the airfoil in the gas turbine engine along the suction side, wherein the pressure side and the suction side interconnect with one another at a leading edge of the airfoil and at a trailing edge of the airfoil positioned aft of the leading edge and the first vortex-reduction passageway is located closer to the leading edge than the trailing edge.

8. The airfoil of claim 7, wherein the first vortex-reduction passageway is configured to conduct gas from the pressure side to the suction side during use of the airfoil in a gas turbine engine in order to inhibit radial migration of a secondary-flow vortex that may form along a radially-outer portion or a radially-inner portion of the suction side.

9. The airfoil of claim 8, wherein the airfoil has an aspect ratio of less than 1.0.

10. A vane adapted for use in a gas turbine engine, the vane comprising
an outer end wall,
an inner end wall spaced from the outer end wall, and
an airfoil that extends from the outer end wall to the inner end wall, the airfoil having a pressure side, a suction side, a first vortex-reduction passageway arranged to extend from the pressure side to the suction side to provide fluid communication from the pressure side to the suction side, an inlet slot formed in the pressure side separately from the first vortex-reduction passageway that is fluidly coupled to the first vortex-reduction passageway, and an outlet slot formed in the suction side separately from the first vortex-reduction passageway that is fluidly coupled to the first vortex-reduction passageway, wherein the inlet slot extends partway through the airfoil from one of the outer end wall and the inner end wall toward the other of the outer end wall and the inner end wall.

11. The vane of claim 10, wherein the first vortex-reduction passageway is configured to conduct gas from the pressure side to the suction side during use of the vane in a gas turbine engine in order to inhibit radial migration of a secondary-flow vortex that may form along a radially-outer portion or a radially-inner portion of the suction side.

12. The vane of claim 10, wherein the first vortex-reduction passageway is spaced apart from a middle portion of the vane that is located about midway along a height of the vane, sized to make up at least a third of the height of the vane, and devoid of any passageways that provide fluid communication directly from the pressure side to the suction side of the vane.

13. The vane of claim 10, wherein the airfoil has an aspect ratio of less than 1.0.

* * * * *